United States Patent
Trinkel

(10) Patent No.: US 6,742,713 B1
(45) Date of Patent: Jun. 1, 2004

(54) ACCESS CONTROLLED SYSTEM WITH ACOUSTIC MECHANICAL VERIFICATION TRANSMITTER

(75) Inventor: Marian Trinkel, Huertgenwald (DE)

(73) Assignee: Deutsche Telekom AG, Bonn (DE)

( * ) Notice: Subject to any disclaimer, the term of this patent is extended or adjusted under 35 U.S.C. 154(b) by 0 days.

(21) Appl. No.: 09/980,963

(22) PCT Filed: May 26, 2000

(86) PCT No.: PCT/EP00/04816

§ 371 (c)(1),
(2), (4) Date: Dec. 4, 2001

(87) PCT Pub. No.: WO00/75880

PCT Pub. Date: Dec. 14, 2000

(30) Foreign Application Priority Data

Jun. 4, 1999 (DE) .......................... 199 25 509

(51) Int. Cl.⁷ .......................... G06K 19/06; G06K 5/00; G06K 7/01

(52) U.S. Cl. .......................... 235/492; 235/375; 235/380; 235/382.5; 235/382; 235/487

(58) Field of Search .......................... 235/492, 382, 235/382.5, 375, 448, 453, 444, 445, 380, 383, 490, 494

(56) References Cited

U.S. PATENT DOCUMENTS

| | | | |
|---|---|---|---|
| 3,628,499 A | 12/1971 | Benford | 116/137 |
| 3,886,327 A | 5/1975 | Dobosi | 235/61.7 B |
| 4,304,992 A | 12/1981 | Kobayashi et al. | 235/449 |
| 5,406,619 A * | 4/1995 | Akhteruzzaman et al. | 379/93.02 |
| 5,583,933 A * | 12/1996 | Mark | 379/357.04 |
| 5,671,271 A * | 9/1997 | Henderson et al. | 379/355.05 |
| 6,257,486 B1 * | 7/2001 | Teicher et al. | 235/380 |
| 6,404,862 B1 * | 6/2002 | Holt | 379/93.02 |
| 6,530,526 B1 * | 3/2003 | Kuschel et al. | 235/489 |

FOREIGN PATENT DOCUMENTS

| | | | | |
|---|---|---|---|---|
| DE | 4435170 C1 * | 1/1996 | | |
| DE | 4435170 | 1/1996 | | |
| DE | 29807972 | 10/1998 | | |
| DE | 29722679 | 4/1999 | | |
| DE | 19754860 | 5/1999 | | |
| EP | 0818084 | 10/1994 | | |
| JP | 62058434 | 3/1987 | | |
| JP | 80043188 | 2/1996 | | |
| JP | 80254995 | 10/1996 | | |
| JP | 11234384 A * | 8/1999 | | H04M/1/27 |
| WO | 9419778 | 9/1994 | | |
| WO | 9813971 | 4/1998 | | |
| WO | 9813972 | 4/1998 | | |
| WO | WO 9934324 A1 * | 7/1999 | | |
| WO | 9934324 | 7/1999 | | |

* cited by examiner

Primary Examiner—Karl D. Frech
Assistant Examiner—Daniel Walsh
(74) Attorney, Agent, or Firm—Davidson, Davidson & Kappel, LLC

(57) ABSTRACT

An access-controlled system includes a portable identification device and a control unit with which the encoded information on the identification device can be read. The control unit allows a user access to the system once the identity of the identification medium has been established. The portable identification device includes a signal generator device configured for generating a reproducible acoustic signal in a mechanical manner. The reproducible acoustic signal includes a clacking noise, a frequency spectrum of the clacking noise encoding information. The signal generator device includes a tongue, plate, and/or curved surface that folds upon an overcoming of an initial resistance, the folding generating the clacking noise. The tongue, plate, and/or curved surface springs back to an original position subsequent to being acted upon.

13 Claims, 4 Drawing Sheets

ACCESS CONTROLLED SYSTEM WITH ACOUSTIC MECHANICAL VERIFICATION TRANSMITTER

This application is a 371 of PCT/EP00/04816 filed on May 26, 2000.

BACKGROUND

The present invention relates to a system including a portable identification medium, for example in the form of a card, and a control unit with which information which is encoded on the identification medium can be read, the control unit allowing a user to access the system once the identity of the identification medium has been established.

Such systems in which a user identifies himself via an identification medium are known in many forms. In this connection, the medium serves as a key for access to the system. In the process, the medium is presented to the control unit and, as soon as the control unit establishes that the medium is authorized, i.e., a matching key, it enables access to the system. In the known systems heretofore, a numeric code, for example, a customer number is stored on a magnetic strip or a chip on the medium, i.e., a card, as individualizing information. The code is then read out via a corresponding reader device integrated in the control unit and is checked by a computer.

In these systems, it is a disadvantage that not only the medium must be equipped with a magnetic strip or a chip, which requires a comparatively large expenditure of effort and money but, above all, that the control unit must be provided with a device for reading out the information, involving a corresponding degree of expenditure. Thus, the control unit must have, in particular, an intake for the medium. This intake, for example, a slot having an appropriate mechanism, requires considerable outlay and is susceptible to vandalism.

Known are, moreover, such systems in which the code is transmitted acoustically with the assistance of an electronic tone generator located on the medium. In these systems, the medium requires a large expenditure of effort and money because of the generator. Besides, the transmission is very unreliable and frequently gives rise to system errors. Moreover, devices in the form of cards are known which have a toothed profile on one edge, the information being encoded in the arrangement of the teeth. The acoustic signal is generated by sweeping an object over the profile, a noise developing in the process. In this context, it is a disadvantage that, in addition to the medium, a further object must exist which is used to generate the signal. Due to the additionally required object, the system is complex and unpractical. Besides, the signal is reproducible only with difficulty since it depends on the speed and completeness of the sweeping movement.

Also known are systems which bring about an identification via spoken speech. These systems are complex and not very reliable since they are dependent on a plurality of incalculable parameters.

SUMMARY OF THE INVENTION

Therefore, an object of the present invention is to provide an access-controlled system which is rugged, easy to handle and inexpensive to manufacture while being highly reliably and reproducible. It is also an object of the present invention to provide an identification medium which supports the system according to the present invention and at the same time is reliable, rugged and inexpensive.

The present invention provides an access-controlled system. The access-controlled system includes a portable identification device including an element configured for generating a reproducible acoustic signal in a mechanical manner, a frequency spectrum of the signal encoding an information. Also included is a control unit configured for reading the encoded information and for allowing a user to access the access-controlled system upon an establishing of an identity of the identification device.

According to the present invention an acoustic signal-generating device is attached to the identification medium which, after a mechanically applied force has acted thereon, for example, subsequent to a pressing by the user, emits an acoustic signal by which the medium can be identified. To enable a reliable identification, it is required for the acoustic signal, whose frequency spectrum encodes information, to be reproducible. A generated signal must correspond to each further generated signal as exactly as possible.

It is conceivable for such a system to be used in many areas. Thus, it is possible for telephone cards or credit cards to the be provided with the device according to the present invention. In the case of a telephone card, the acoustic signal would be picked up via a microphone of the telephone system, for example, through the handset, and sent to a central computer via the telephone line. The central computer would then carry out the billing of the telephone call, the billing being allocated to the owner of the card via the acoustic signal. In the case of a credit card, it would be possible for the customer or account number of the card holder to be encoded in the signal. In this context, however, it is advantageous if the user authorizes himself/herself by entering a PIN code which is only known to him/her into the control unit.

It is a particular advantage of the present invention that systems of that kind are rugged and simple. Thus, the acoustic signal can be picked up by a simple microphone which is integrated in the control unit. Complicated electronics featuring a read head and, above all, the insertion aperture can be dispensed with. In this context, known systems, in particular speech recognition systems, are available for evaluating the acoustic information. The system makes it possible for the medium to be reliably identified.

In principle, strings, rods, tongues, membranes, plates or air columns can be used as signal-generating device. However, it is particularly simple and, therefore, advantageous, if the signal-generating device features a tongue and/or a curved surface which is attached onto the medium in such a manner that it/they can be acted upon by a user pressing with a finger against a resistance, and that it/they emit(s) the signal ("clack") when the resistance is overcome. Devices of that kind are known as toys (frog clickers). After the clacking threshold is overcome, the device springs back to the initial position. In this context, the mostly different noise ("click") emitted while springing back can also be used for encoding information.

In this context, in an embodiment, the encoding of the information is effected by the individual shaping of the tongue or surface and/or by the design of their suspension, i.e., for example, by changing the resistance to be overcome. Extensive tests have shown that such a device can generate an individual signal from whose frequency spectrum the coded information can be reliably read, advantageously after a Fourier transformation. In the course of time, the characteristic does not or only slightly change, it being possible for such a change to be allowed for via the computational algorithms. It is also conceivable for the information to be encoded by individually shaping the resonator, the individualization having to be effected by more significant measures in this case.

It is a special advantage of the medium according to the present invention that no complex electronics and, in particular, no battery are included so that its disposal does not create any problems. At the same time, the "frog clicker function" is easy to be implemented, offering a large variability of the encoded information, and can easily be integrated in a rugged medium, in particular, in the form of a card. Such a card having an integrated "frog clicker function" is durable and stands out by its compact design. In addition, it is easy and inexpensive to manufacture and particularly suitable for use in telecommunications media that use the speech frequency band. It should be pointed out as an advantage that the signal-generating medium according to the present invention does not require any further aids as were needed in related art heretofore.

In an embodiment, the tongue or curved surface are integrally formed on the identification medium which is designed as a card. To produce a resistance, it is advantageous for the tongue to be provided with a longitudinal groove or with walls which project perpendicularly to the top surface of the card. A "clacking" effect can also be attained via a peripheral clamping on both sides. The integral formation provides a good coupling of the device to the resonator and, in this manner, a correspondingly good sound amplification.

It is particularly advantageous if the encoding can be carried out by the user himself/herself. To this end, the user can be given corresponding possible methods. Thus, the user receives, for example, a card whose tongue which does not have any changes yet and which therefore emits a basic noise. The individualization is then carried out by the user via punching or pressing depressions into the tongue, or by shaping the curved surface. In this context, the mechanical variation brings about an acoustic variation. The noise generated in this manner is subsequently stored in a data base together with the necessary information. Thus, the card is initialized.

In an embodiment, the medium is designed as a key tag, thus being handy at any time and relatively unlosable. Moreover, it can be advantageous to provide the medium, in particular the card, with a magnetic strip and/or with a chip or to provide known cards with a device according to the present invention for generating an acoustic signal. In this context, the acoustic signal can be used for a redundant individualization so that security is further increased.

BRIEF DESCRIPTION OF THE DRAWINGS

The present invention is depicted on the basis of the drawings and will be explained in greater detail in the following.

DETAILED DESCRIPTION

Figure 1:
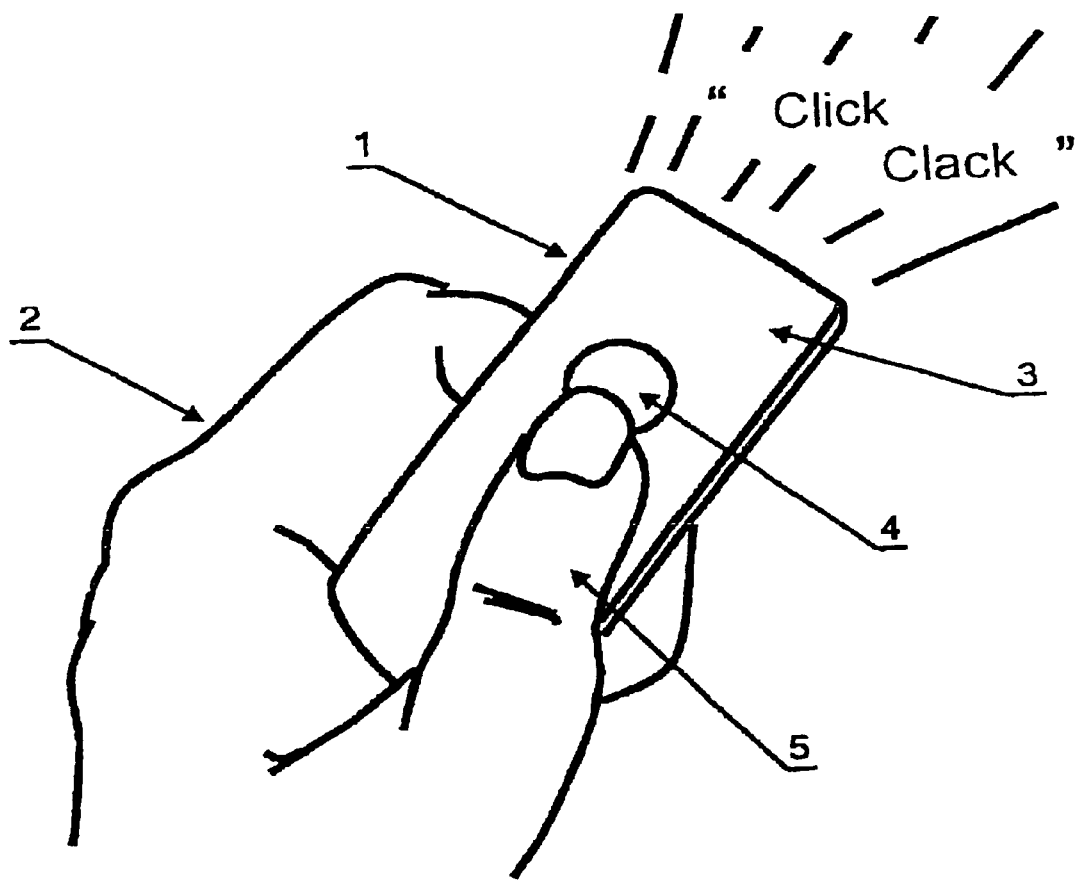
FIG. 1 shows a control unit and a hand with an identification medium in the form of a card.

FIG. 1 shows a control unit 20 and an identification medium in the form of a card 1 in the known cheque card size which is held in hand 2 of a user of the system. On card 1, individual information is encoded in the acoustic signal which is emitted by a curved surface 4 formed in card surface 3 when the curved surface is pressed in by the pressing of thumb 5 against a resistance. The information is encoded in the frequency spectrum of the noise ("click-clack").

Figure 2:
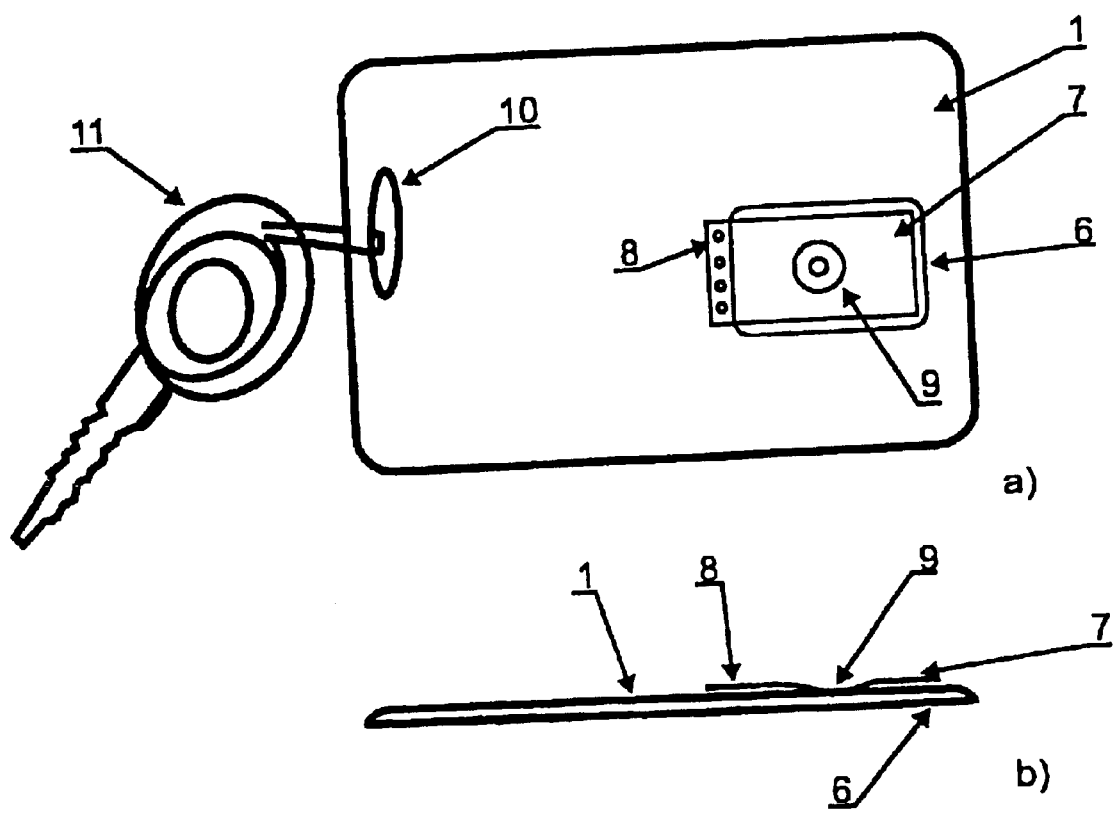
FIG. 2 shows a card in a top view (a) and in an elevation (b)

Card 1 is manufactured in known manner from plastic (PE) and serves as a resonator. Provided in the card is an opening 6 which is covered by a tongue 7 in the case of the embodiment according to FIG. 2. Tongue 7 is formed of metal and secured onto the card via weld points 8 in a manner that it is prestressed. Tongue 7 has a depression 9 which generates a tension, thus influencing the frequency spectrum of the acoustic signal. Card 1 according to FIG. 2 has a cut-out 10 to which a key 11 can be attached.

Figure 3:
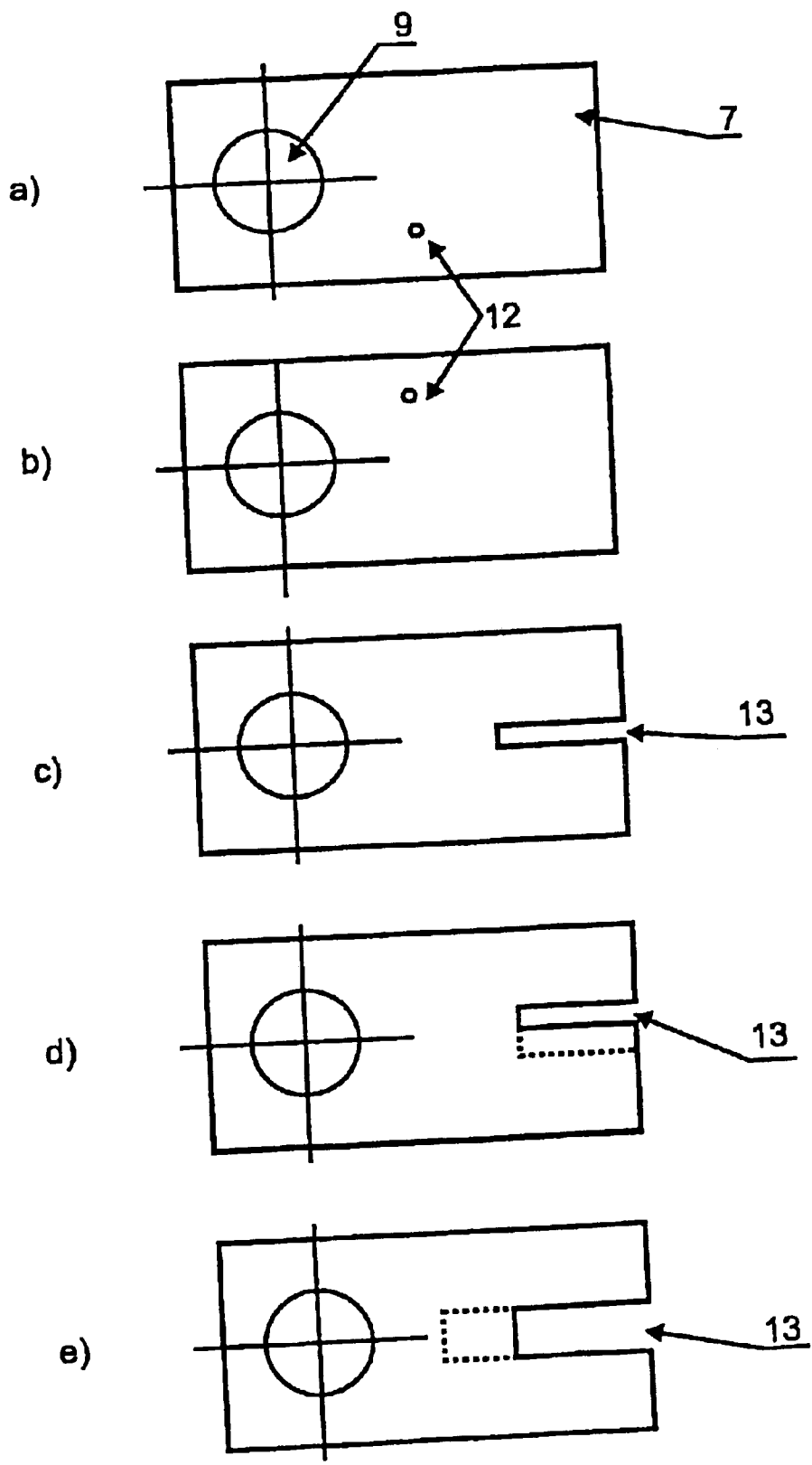
FIGS. 3a)–3e) show the tongue of a card with different shapes.

FIG. 3 shows tongues which are differently shaped and, therefore, generate different noises. All tongues have a depression 9. Provided in the tongues according to FIGS. 3a) and 3b) are small bores 12 which give rise to a shift in the frequency spectrum. Bores 12 are placed at different locations of tongues 7 and, therefore, generate different frequencies. In tongues 7 of the embodiments shown in FIGS. 3c), 3d) and 3e), provision is made for slits 13 at different locations or in different sizes. The shown alterations of tongue 7, which can be effected by the users themselves, give rise to differences in the frequency spectrum which can be detected by the system, as tests have shown.

FIG. 3 shows tongues which are differently shaped and, therefore, generate different noises. All tongues have a depression 9. Provided in the tongues according to Figures a) and b) are small bores 12 which give rise to a shift in the frequency spectrum. Bores 12 are placed at different locations of tongues 7 and, therefore, generate different frequencies. In tongues 7 of examples c), d) and e), provision is made for slits 13 at different locations or in different sizes. The shown alterations of tongue 7, which can be effected by the users themselves, give rise to differences in the frequency spectrum which can be detected by the system as the tests showed.

Figure 4:
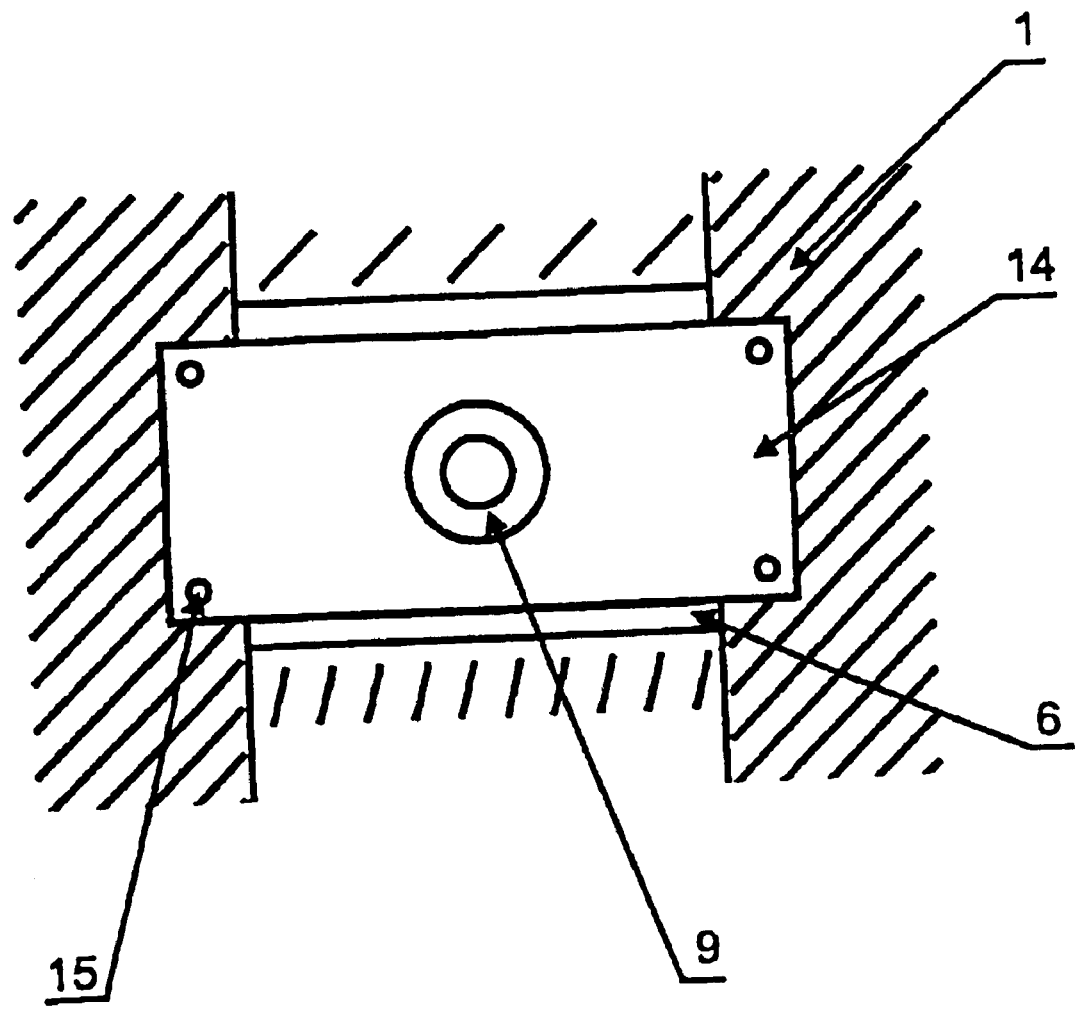
FIG. 4 shows a tongue clamped on both sides.

FIG. 4 shows the cut-away portion of a card 1 featuring opening 6, opening 6 being covered by a tongue 14. Tongue 14 is fastened to the card with rivets 15 on both sides, and has a depression 9 for individualization. In this exemplary embodiment, the frequency spectrum can be varied via the tension with which tongue 14 is clampled.

What is claimed is:

1. An access-controlled system comprising:
a portable identification device including a signal generator device configured for generating a reproducible acoustic signal in a mechanical manner, the reproducible acoustic signal including a clacking noise, a frequency spectrum of the clacking noise encoding an information, the signal generator device including at least one of a tongue, a plate, and a curved surface configured for folding upon an overcoming of an initial resistance, the folding generating the clacking noise, the respective at least one of the tongue, the plate, and the curved surface further configured for springing back to a respective original position subsequent to being acted upon; and
a control unit configured for reading the encoded information and for allowing a user to access the access-controlled system upon an establishing of an identity of the identification device.

2. The access-controlled system as recited in claim 1 wherein the control unit includes a microphone useable for feeding the acoustic signal to a computing unit configured for establishing the identification of the identification device.

3. The access-controlled system as recited in claim 1 wherein the identification device includes a card.

4. The access-controlled system as recited in claim 3 wherein the card includes a plastic material.

5. The access-controlled system as recited in claim 3 wherein the card has dimensions of a credit card.

6. The access-controlled system as recited in claim 1 wherein the identification device includes at least one of a membrane body and a resonator.

7. The access-controlled system as recited in claim 1 wherein the control unit is configured for receiving a code.

8. The access-controlled system as recited in claim 7 wherein the code is an acoustic PIN code.

9. An identification device configured for use in an access-controlled system, the access-controlled system including a control unit configured for reading information encoded by the identification device and for allowing a user to access the access-controlled system upon an establishing of an identity of the identification device, the identification device comprising a signal generator device configured for generating a reproducible acoustic signal in a mechanical manner when acted upon by the user, the reproducible acoustic signal including a clacking noise, a frequency spectrum of the clacking noise encoding an information, the signal generator device including at least one of a tongue, a plate, and a curved surface configured for folding upon an overcoming of an initial resistance, the folding generating the clacking noise, the respective at least one of the tongue, the plate, and the curved surface further configured for springing back to a respective original position subsequent to being acted upon.

10. The identification device as recited in claim 9 wherein an encoding of the information is a function of a respective shaping of the respective at least one of the tongue, the plate, and the curved surface.

11. The identification device as recited in claim 9 wherein the identification device includes at least one of a membrane body and a resonator, and wherein an encoding of the information is a function of a respective shaping of the respective at least one of the membrane body and the resonator.

12. The identification device as recited in claim 9 wherein the identification device includes a card and at least one of a tongue, a plate, and a curved surface integrally formed thereon.

13. The identification device as recited in claim 9 wherein an encoding of the information is capable of being performed by the user using an encoding method selected from a predetermined plurality of encoding methods.

* * * * *